June 27, 1939.  W. A. BLACK  2,164,267
METHOD OF AND APPARATUS FOR MAKING MULTIPART TUBING
Filed April 10, 1937 2 Sheets-Sheet 1
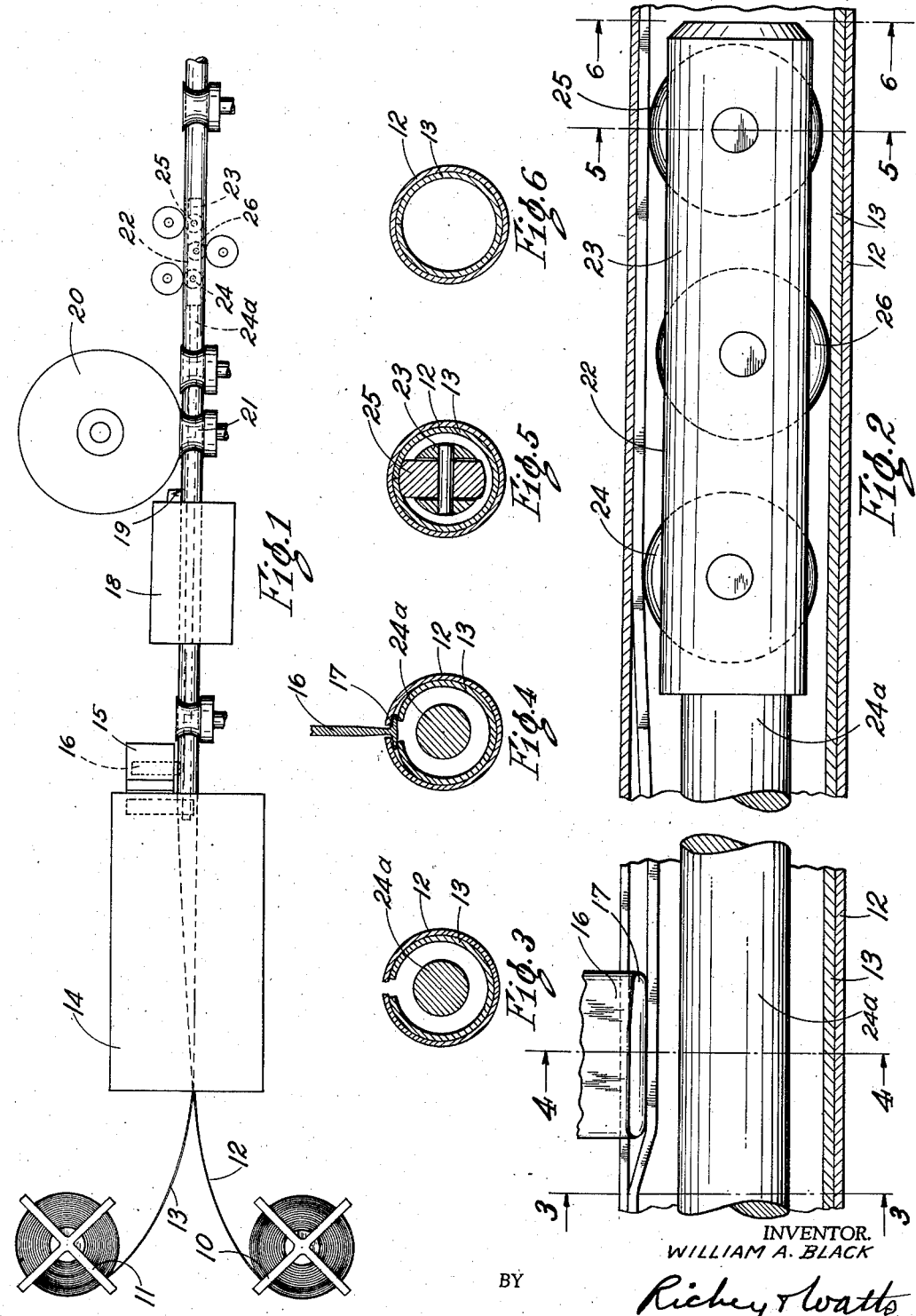
INVENTOR.
WILLIAM A. BLACK
BY
Richey + Watts
ATTORNEYS

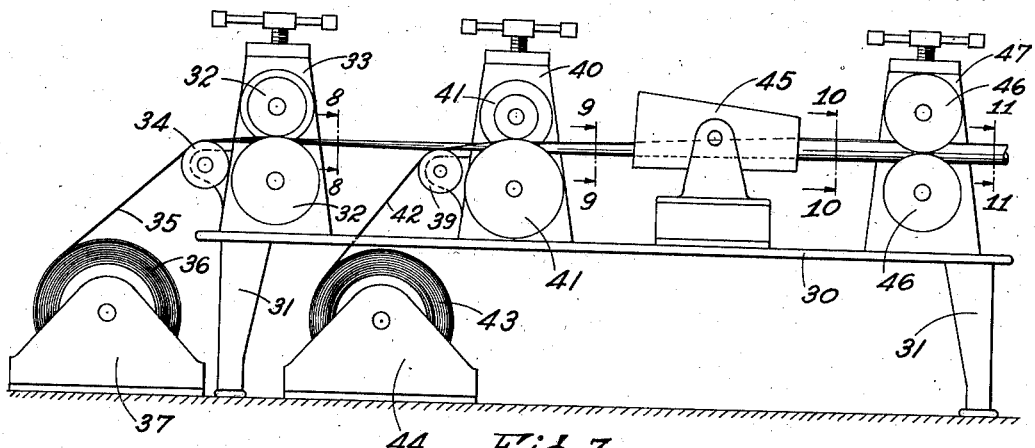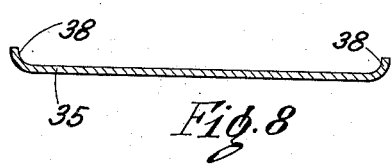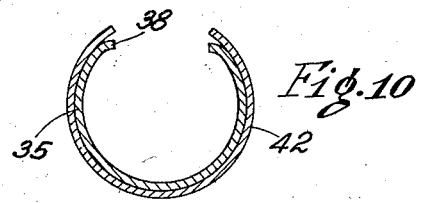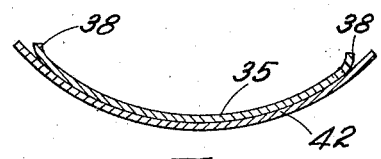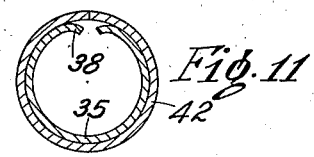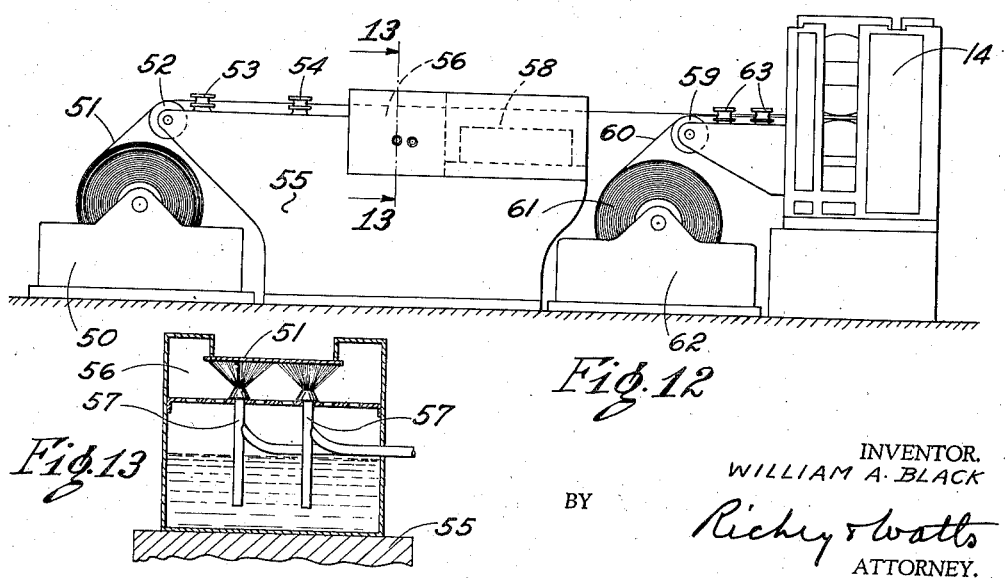

Patented June 27, 1939

2,164,267

UNITED STATES PATENT OFFICE 2,164,267

METHOD OF AND APPARATUS FOR MAKING MULTIPART TUBING

William A. Black, East Cleveland, Ohio, assignor to Steel & Tubes, Inc., a corporation of Ohio Application April 10, 1937, Serial No. 136,165

13 Claims. (Cl. 113—33)

This invention relates to the art of manufacturing metal tubing and is particularly concerned with a new and improved method of and apparatus for manufacturing composite or multi-part metal tubing.

By the present invention there is provided a method of and apparatus for manufacturing multi-part metal tubing rapidly, cheaply, and continuously, if desired. More specifically, the present invention contemplates the continuous manufacture of multi-part tubing from two strips of sheet metal one of which consists of ferrous metal. The two strips of metal are placed against each other and are formed simultaneously into concentric tubes constituting a tubular blank. The opposed edge surfaces of the outside tube are then welded together in any suitable manner while the edge portions of the inner tube are treated so as to provide therebetween a medium of higher electrical resistance than exists between the abutting edges of the outer tube to prevent the edge surfaces thereof from being welded together during the welding of the edge surfaces of the outside tube. The edge portions of the inside tube may be treated for such purpose in various ways. For example, the edge portions may be depressed and maintained out of contact with each other and with the inner wall of the outer tube during the welding of the latter; or the edge portions may be bent prior to the forming of the strip into tubular form so that the edge portions will extend inwardly and out of contact with each other and with the outer tube during the welding of the edge surfaces of the latter. Following the welding of the outer tube, the thus deformed edge portions of the inner tube are pressed outwardly so that the tube is of substantially the same cross sectional shape as the other tube and the edges are brought into abutting relation with each other. Still another way of treating the edge portions of the inner tube for the above specified purpose is to provide such edge portions with a quantity of material which has a higher electrical resistance than the metal and which will prevent welding together of the edge surfaces of the inner tube while the edges of the outer tube are being welded.

The completed multi-part tube embodying the present invention consists of an outer tube having a longitudinally extending welded seam, and an inner tube of substantially the same cross sectional shape as the outer tube fitting snugly against the inner surface of the outer tube with its edge surfaces not welded to each other, but, preferably, abutting against each other.

In the drawings accompanying and forming a part of this specification, wherein similar reference characters denote corresponding parts:

Figure 1 is a diagrammatic illustration of one form of apparatus for practicing the present invention, Figure 2 is an enlarged fragmentary sectional view illustrating a portion of the multi-part tubing embodying this invention as it is being formed, Figures 3, 4, 5, and 6 are sectional views taken on the lines 3—3, 4—4, 5—5, and 6—6, respectively, of Figure 2.

Figure 7 is a diagrammatic illustration of a modified form of apparatus,

Figures 8, 9, 10, and 11 are transverse sectional views of the blank during the forming thereof in the apparatus of Figure 7 and taken on the lines 8—8, 9—9, 10—10, and 11—11, respectively, of Figure 7, Figure 12 is a diagrammatic illustration of a further modified form of apparatus, and Figure 13 is a sectional view taken on the line 13—13 of Figure 12.

In Figure 1 of the drawings the numerals 10 and 11 denote reels upon which are positioned coils of strip metal 12 and 13. The reels are so positioned that both strips may feed to a forming machine 14 in a substantially horizontal position with the strip 13 lying against the strip 12. The strip 12 from which the outer tube is to be formed is of greater width than the strip 13, and may be made of a relatively expensive ferrous alloy metal, for example, stainless steel or other corrosion resistant metal, whereas the strip 13 may be made of a relatively inexpensive metal such as low carbon steel. Strips 12 and 13 are, respectively, of such widths that when they are formed into tubing with the opposed edge surfaces of the outer tube welded together, the edge surfaces of the inner tube will abut together and the outer surface of the inner tube will fit snugly against the inner surface of the outer tube.

The forming machine 14 may be of any suitable design, preferably one capable of continuously and progressively forming strip metal from a flat to a cylindrical form. The two strips 12 and 13 are introduced into the entering end of the forming machine in a substantially flat form and are simultaneously formed into a tubular blank having a longitudinally extending seam cleft. As shown in Figure 3, the tubular blank takes the form of two concentric tubes, wherein the seam cleft of the inner tube is slightly wider than the seam cleft of the outer tube.

The discharge end of the forming machine 14 has secured thereto a housing 15 which slidably receives the shank portion 16 of a shoe 17. The shank portion 16 extends through the seam cleft of the outer tube and positions the shoe 17 between the walls of the outer and inner tubes. The shoe 17 engages the spaced edge portions of the inner tube and depresses them inwardly, sufficient pressure being exerted on the edge portions to deform them beyond the elastic limit of the metal so that they will not spring back into engagement with the outer tube after they have passed the shoe and during the welding together of the edge surfaces of the outer tube.

The tubular blank then moves into a stand of feed rolls 18 which may be of any suitable type for feeding a tubular blank into the welding throat of an electric resistance welding machine. Secured to the housing of the stand of feed rolls 18 at the discharge end thereof is a seam guide 19, which extends into the open seam cleft of the outer tube and serves to position the edges thereof properly for entry into the welding throat of the welding machine. The welding throat includes the electrodes 20 and the side pressure rolls 21. As the tubular blank passes through the welding throat the opposed edge surfaces of the outer tube are welded together. The edge portions of the inner tube which had been depressed by the shoe 17 and are spaced apart from each other and from the edge portions of the outer tube are not effected by this welding together of the seam edges of the outer tube.

The tube passes from the welding throat of the welding machine to the unit 22 which consists of a housing 23 secured on the end of a mandrel rod 24a, suitably supported within the tube in the usual manner. Rotatably mounted in the housing 23 are a plurality of rolls 24, 25, and 26. The rolls 24 and 25 are adapted to engage the edge portions of the inner tube, while the roll 26 engages the opposite portion of the blank. As the tube enters the unit 22, the rolls 24 and 25 engage the depressed edge portions of the inner tube and press them out against the outer tube and also bring them into abutting relation with each other thus making the cross sectional shape of the inner tube substantially like that of the outer tube. During the welding of the opposed edge surfaces of the outer tube, the diameter thereof is reduced slightly so that when the edge surfaces of the inner tube are later brought into engagement with each other, they are firmly pressed against each other and the inner tube fits snugly within the outer tube and is pressed tightly thereagainst.

In Figures 7 to 11, inclusive, of the drawings showing a modified form of apparatus, an elongated table 30 supported on suitable legs 31 carries, at one end thereof, a forming pass including the rolls 32 suitably mounted in a housing 33. Supported on the housing 33 at the entry end of the forming pass is a guide roll 34. Strip metal 35 is fed from the coil 36, mounted in a suitable holder 37, over the guide roll 34 and between the rolls 32. In this roll pass the longitudinal edge portions of the strip metal 35 are bent on the same side of the plane of the strip 35 to form flange portions 38, as illustrated in Figure 8. As shown in this figure the edge portions of the strip are bent upwardly, however, where forming apparatus is employed which forms a tube blank with the seam cleft on the bottom of the tube, the edge portions of the strip would be bent downwardly.

The strip 35 then moves forward and passes over the guide roll 39 supported by the housing 40 of the next forming pass. As the strip 35 passes over the guide roll 39, it engages a second strip of metal 42 which is fed from a coil 43 mounted in a holder 44, disposed below the table 30. The strips of metal 35 and 42 pass between the rolls 41 mounted in a housing 40 where the two strips of metal are simultaneously formed into the arcuate shape shown in Figure 9.

The two strips of metal pass from the rolls 41 into a forming cone 45 in which they are given the shape generally shown in Figure 10. From the cone 45 the strips pass between the rolls 46, carried in the housing 47, wherein the edge surfaces of the outer tube are brought into abutting relation preparatory to entering the feed roll pass 18 (Figure 1), from which they pass into the welding throat of the welding apparatus, for example the welder of Figure 1. In the welding apparatus the opposed edge surfaces of the outside tube are welded together. The edge portions of the inner tube, having been given a definite set or bend by the rolls 32, are maintained out of contact with each other and the inner surface of the outer tube, so that during the welding of the opposed edge surfaces of the outer tube, welding of the edge surfaces of the inner tube is prevented.

From the welding apparatus, the tube then passes through the unit 22 where the depressed edge portions 38 of the inner tube are brought into abutting relation and firmly pressed against each other, as described in connection with the apparatus of Figure 1, whereby the inner tube fits snugly within the outer tube and is pressed tightly thereagainst with the edge surfaces preferably abutting tightly against each other.

In practicing the present invention, the two metal strips are simultaneously and continuously formed into concentric tubes constituting a multi-part article. The edge portions of the inner tube are positioned out of contact with the outer tube so that they do not interfere with the welding of the longitudinal seam of the outer tube. After such welding, the edge portions of the inner tube are acted upon by the unit 22 so that the cross sectional shape of the inner tube is substantially like that of the outer tube with the edge surfaces thereof abutting against each other but not welded together. The abutting of the edges of the inner tube against each other tends to slightly expand the inner tube and thereby to increase and maintain the snugness of the fit of the two tubes which was created during the forming operation.

In Figures 12 and 13 of the drawings there is illustrated apparatus which may be employed for treating the outer surface of the strip of metal including the edge portions thereof, from which the inner tube of the blank is formed, and is preferably disposed in advance of the forming unit disclosed in Figure 1. This apparatus comprises a coil holder 50 in which is mounted a coil of sheet metal 51. The metal 51 is fed over a guide roll 52 and between two sets of edge engaging guide rolls 53 and 54, which are mounted on a suitable base 55. The strip 51 then passes through a suitable chamber 56 (Figure 13) wherein the lower surface including the edge portions of the strip are treated by placing thereon a coating of a suitable insulating material or enamel. This coating is sprayed on the surface of the metal by nozzles 57. The strip passes from the chamber 56 into an oven 58 where the insulating material or enamel is partially dried. The strip 51 passes from the oven 58 and over a guide roll 59 where it engages another similar but untreated strip 60, which is fed from a coil 61 disposed below the guide roll 59 in a suitable holder 62. The two strips of metal pass between guide rolls 63 and into the forming apparatus 14 of Figure 1.

When the apparatus of Figures 12 and 13 is employed in conjunction with the apparatus of Figure 1, it is unnecessary to use the shoe 17 shown in Figure 4. The insulating material which has been sprayed on the outer surface of the strip 51 from which the inner tube is formed provides a separating means between the edge portions of the inner tube and the inner surface of the outer tube of higher electrical resistance than the metal itself and thereby prevents welding of the edges of the inner tube together during the welding of the opposed edge surfaces of the outer tube. Where, in this embodiment, there has been disclosed the use of an insulating material which is sprayed on the outer surface including the edge portions of the metal forming the inner tube, other insulating materials for example paper, Bakelite tape or the like may be inserted between the opposed edges of the inner tube to provide separating means for preventing the welding thereof during the welding of the outer tube.

Having thus described the invention what I desire to obtain by Letters Patent is defined in what is claimed.

I claim:

1. The method of manufacturing multi-part metal tubing which includes the steps of simultaneously forming strips of metal into a multi-part tubular blank, welding the opposed edge surfaces of the outer tube to form a tube having a longitudinally welded seam, and at some time prior to the welding operation treating the edge portions of the strip constituting the inner tube to prevent the edge surfaces thereof from being welded together during the welding of the outer tube.

2. The method of manufacturing multi-part metal tubing which includes the steps of simultaneously forming strips of metal into a multi-part tubular blank, depressing the edge portions of the inner tube out of contact with each other and with the inner surface of the outer tube, welding the opposed edge surfaces of the outer tube to form a tube having a longitudinally extending welded seam, and shaping the inner tube so that its cross-sectional shape is substantially like that of the outer tube with the edge surfaces thereof in abutting relation.

3. The method of manufacturing multi-part metal tubing which includes the steps of providing the longitudinal edge portions of a flat ferrous metal strip with a coating of insulating material, placing said strip of metal against a second strip of metal, simultaneously and continuously forming said strips of metal into a multi-part tubular blank, and welding the opposed edge surfaces of the outer tube to form a tube having a longitudinally extending welded seam.

4. The method of manufacturing multi-part metal tubing which includes the steps of spraying one surface including the edge portions of a flat metal strip with a coating of liquid insulating material, partially drying the insulating material, placing said strip of metal against a second strip, simultaneously forming both strips of metal into a multi-part tubular blank, and welding the opposed edge surfaces of the outer tube to form a tube having a longitudinally extending welded seam.

5. The method of manufacturing multi-part metal tubing which includes the steps of bending the longitudinal edges of a strip of metal on the same side of the plane of said strip, placing said strip of metal against a second strip with the bent edges extending away from the latter strip, simultaneously forming both strips of metal into a multi-part tubular blank, welding the opposed edge surfaces of the outer tube to form a tube having a longitudinally extending welded seam and shaping the inner tube so that its cross sectional shape is substantially like that of the outer tube.

6. In apparatus for manufacturing multi-part metal tubing, the combination of means, including forming rolls for simultaneously forming two strips of metal into concentric tubes constituting a tubular blank, means, disposed outside of said blank, for welding together the opposed longitudinal edge surfaces of the outer tube of said blank and means engaging the inner tube for bending the edge portions thereof to provide a space of high electrical resistance between the longitudinal edges thereof during welding together of the abutting edges of the outer tube.

7. In apparatus for manufacturing multi-part metal tubing, the combination of forming means for simultaneously forming strips of metal into a multi-part tubular blank, welding means, and means positioned between said forming and welding means for bending the edge portions of the inner tube out of contact with the inner surface of the outer tube, said means having a shank portion extending through the seam cleft of the outer tube and a transverse portion positioned between the inner surface of the outer tube and the outer surface of the inner tube.

8. In apparatus for manufacturing multi-part tubing, the combination of forming means for simultaneously forming strips of metal into a multi-part tubular blank, welding means for welding the longitudinal seam of the outer tube, and means positioned in advance of the forming means for bending the edges of one strip on the same side of the plane of said strip.

9. In apparatus for manufacturing multi-part tubing, a combination of forming means for simultaneously forming strips of metal into a concentric tube constituting a tubular blank, welding means for welding a longitudinal seam of the outer tube, and means positioned in advance of said forming means for coating the edge portions of one strip with an insulating material to prevent the welding together of the edge surfaces thereof.

10. In apparatus for manufacturing multi-part tubing, the combination of forming means, welding means, means positioned between said forming and welding means for bending the edge portions of the inner tube out of contact with the inner surface of the outer tube, said last named means having a shank portion extending through the seam cleft of the outer tube and a transverse portion positioned between the inner surface of the outer tube and the outer surface of the inner tube, and means associated with the discharge end of the welding means for shaping the inner tube so that its cross sectional shape is substantially like that of the outer tube with its edge surfaces in abutting relation.

11. The method of making multipart tubing which includes the steps of forming separate strips of metal into a pair of separate, telescoped, substantially concentric, circumferentially engaging tube blanks, each blank having longitudinally extending seam edges, the edges of the outer tube blank abutting each other, and the edges of the inner tube blank having therebetween a medium of higher electrical resistance than exists between the abutting edges of the outer tube blank, and electric resistance welding together the abutting edges of the outer tube blank only by passing welding current from edge to edge thereof while pressing said edges together with welding pressure.

12. The method of manufacturing multi-part metal tubing which includes the steps of bending a pair of metal strips into concentric tubular shape, electrically welding together the opposing edges of the outer strip to form a tube having a longitudinally extending welded seam, at some time prior to the welding operating bending the inner strip so that the same is positioned out of contact with the inner surfaces of the edge portions of the outer strip during the welding operation, and after welding bending the inner strip into snug fitting engagement with the outer welded tube.

13. The method of manufacturing multi-part metal tubing which includes the steps of continuously and progressively bending a pair of separate metal strips into concentric tubular shape, continuously and progressively abutting and pressing the edge surfaces of the outer strip together with welding pressure while flowing suitable electric current from the outer surface of the outer strip across the abutting edge surfaces thereof to form a welded outer tube, and at some time prior to the welding operation treating the inner strip so as to prevent a flow of welding current across the edge surfaces thereof during welding of the outer strip.

WILLIAM A. BLACK.